United States Patent [19]
Parker et al.

[11] Patent Number: 5,928,721
[45] Date of Patent: Jul. 27, 1999

[54] COATED AIRBAG FABRIC

[75] Inventors: Richard Henry Parker; Dennis L. Riddle, both of LaGrange, Ga.

[73] Assignee: Milliken & Company, Spartenburg, S.C.

[21] Appl. No.: 08/922,805

[22] Filed: Sep. 3, 1997

Related U.S. Application Data

[62] Division of application No. 08/601,303, Feb. 16, 1996, abandoned.
[60] Provisional application No. 60/003,295, Sep. 6, 1995.
[51] Int. Cl.⁶ ........................................ B05D 5/00
[52] U.S. Cl. ..................... 427/197; 427/273; 427/288; 427/348; 442/76
[58] Field of Search .................... 427/180, 197, 427/273, 288, 348, 375, 195; 442/61, 59, 76

[56] References Cited

U.S. PATENT DOCUMENTS 3,682,738  8/1972  Smith .......................................... 442/62

FOREIGN PATENT DOCUMENTS 06092193  4/1994  Japan .

*Primary Examiner*—Marion McCamish
*Assistant Examiner*—Elizabeth M. Cole
*Attorney, Agent, or Firm*—Terry T. Moyer; James M. Robertson

[57] ABSTRACT

The present invention provides a coated fabric, including a lightly fused coating of thermoplastic powder material dispersed across at least a portion of a fabric substrate to a degree at which the air permeability is reduced to a level not greater than 1 cubic foot per minute per square foot of fabric at 0.5 inches of water while a high degree of flexibility is maintained.

7 Claims, 2 Drawing Sheets

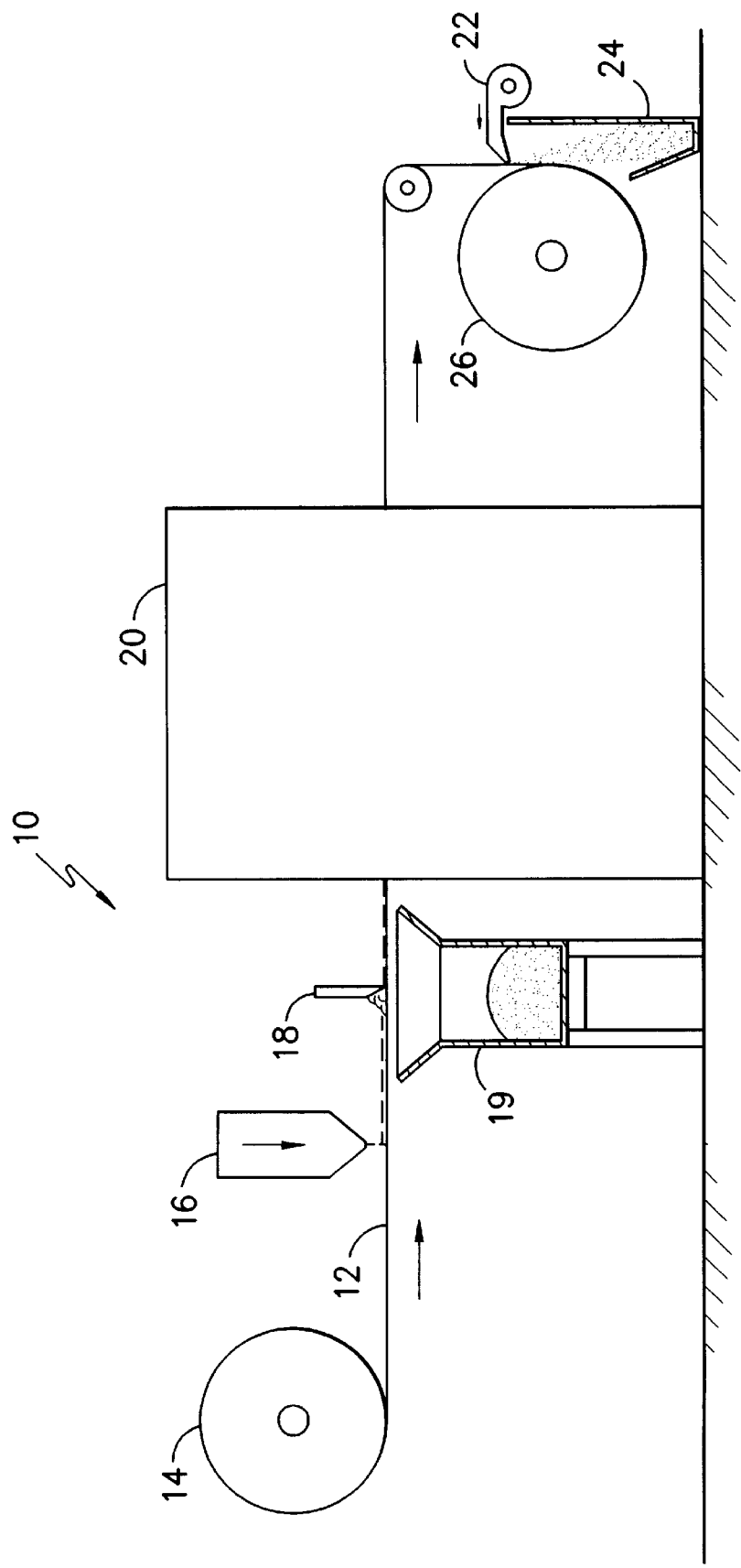
FIG. -1-

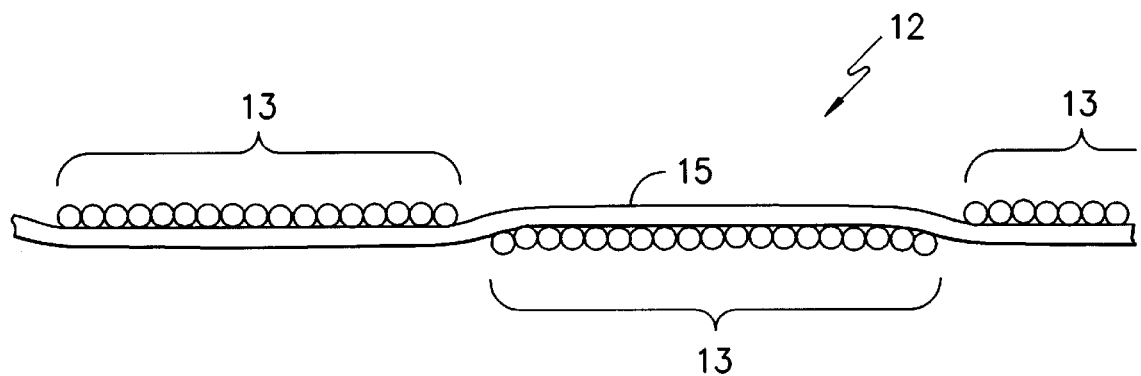
FIG. −2−
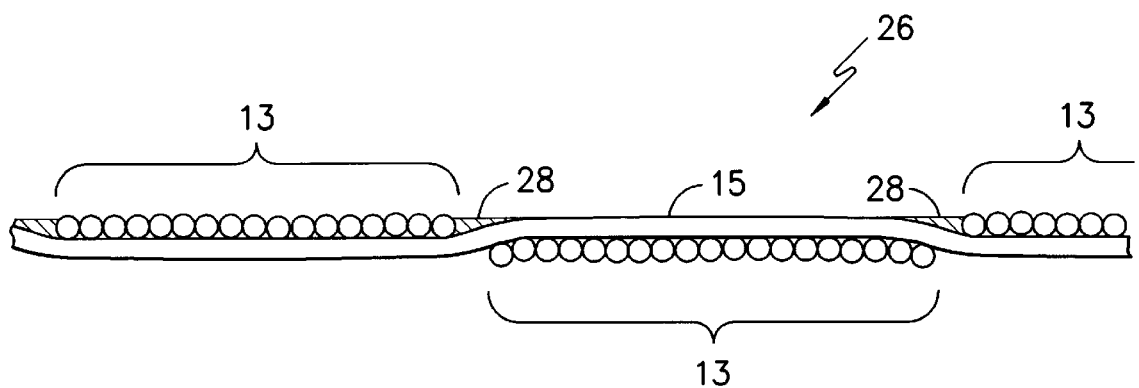
FIG. −3−

COATED AIRBAG FABRIC

This application is a divisional of Ser. No. 08/601,303, filed on Feb. 16, 1996, now abandoned, of Richard Henry Parker and Dennis L. Riddle for Coated Airbag Fabric which claims priority from earlier filed provisional application No. 60/003,295 having a filing date of Sep. 6, 1995 reference being made herein to obtain the benefit of such earlier filing date.

FIELD OF THE INVENTION

This invention relates generally to coated fabrics and more particularly concerns fabrics for use in automotive restraint cushions which have low permeability, yet avoid the use of heavy coatings such as neoprene, silicone and the like, which have historically been used. More specifically, the present invention relates to a coated airbag fabric, which includes a very light fused coating preferentially disposed within the voids of a woven fabric. The fused coating is applied in powder form at a controlled rate and then heat fused such that the coating level does not exceed one ounce per square yard of the fabric substrate which is coated while still yielding a very low permeability fabric having an air permeability of not greater than 1 cubic foot per minute per square foot of fabric at a differential pressure of 0.5 inches of water, when measured in the manner of Federal Test Method 5450. A variation of the invention involves selectively fusing areas of powder coated fabric in a defined pattern to yield a fabric possessing selective air permeability characteristics which fall within desired ranges.

BACKGROUND

Airbags for motor vehicles are known and have been used for a substantial period of time. A typical construction material for airbags has been a nylon fabric, coated with an elastomer such as polychloroprene or silicone. The fabric used in such bags is typically a woven fabric formed from synthetic yarn by weaving practices which are well known in the art.

The coated material has found acceptance because it acts as an impermeable barrier to the inflation medium. This inflation medium is generally a nitrogen gas, generated from a gas generator or inflator, which is conveyed into the cushion at a relatively warm temperature. The coating obstructs the permeation of the fabric by the hot gas, thereby permitting the cushion to rapidly inflate, without undue decompression, during a collision event.

Airbags may also be formed from uncoated fabric which has been woven in a manner that creates a product possessing low permeability, or from fabric that has undergone treatment, such as calendering, to reduce permeability. Fabrics which reduce air permeability by calendering or other mechanical treatments after weaving are disclosed in U.S. Pat. No. 4,921,735 issued May 1, 1990 to Bloch and U.S. Pat. Nos. 4,977,016 issued Dec. 11, 1990; 5,010,663 issued Apr. 30, 1991 and 5,073,418 issued Dec. 17, 1991 to Thornton et al. (all incorporated by reference).

The coating of a fabric with an elastomer such as polychloroprene or silicone typically requires the application of that elastomer from a solution in a volatile solvent. This solvent must then be evaporated and the elastomeric system cured. This process of evaporation and curing typically requires the application of heat over a considerable period of time. As will be appreciated, a lengthy curing process serves to significantly raise the cost of the coated fabric and complicates the overall production process which leads to inherent reductions in efficiency. While, as indicated above, it is possible to weave a fabric in a structure which is sufficiently tight to substantially reduce air permeability, it is generally accepted that weaving alone should be followed by a separate heating and cooling process to allow the yarns to shrink, thereby forcing them into a tighter construction. Such steps are detailed in U.S. Pat. No. 5,356,680 to Krummheuer et al. (incorporated by reference). The need for such an additional step is, of course, undesirable due to the length of time which it requires and the additional complexity which it introduces to the process.

Another problem which is encountered with traditional coated fabric wherein relatively high levels of polychloroprene or silicone are applied or a tightly woven fabric undergoes a substantial heat shrinking procedure, is a loss of flexibility in the fabric. As will be appreciated, flexibility and low weight are desirable features to have in the fabric since these characteristics facilitate the construction of the airbags once manufacture of the fabric is completed. Such flexibility and low weight are also desirable in the packaging of the final airbag product in the relatively tight confines of standard airbag modules which must be mounted within the steering column or dashboard of a vehicle.

In light of the background above, it can be seen that there is a need for an airbag fabric which provides controlled low air permeability while maintaining flexibility and light weight and which does not require extensive curing or heat treatment processes in its manufacture. The present invention provides such a fabric and therefore represents a useful advancement over the present art.

OBJECTS AND SUMMARY

In view of the foregoing, it is a general object of the present invention to provide a coated fabric, including a lightly fused coating of thermoplastic powder material dispersed across at least a portion of a fabric substrate to a degree at which the air permeability is reduced to a level not greater than 1 cubic foot per minute per square foot of fabric at 0.5 inches of water while a high degree of flexibility is maintained.

In that respect, it is an object of the present invention to provide a coated fabric having a light coating of fused thermoplastic powder preferentially dispersed within the voids of the fabric such that the coating level does not exceed one ounce of coating per square yard of fabric.

It is a feature of the present invention to provide a coated fabric having a light coating of fused thermoplastic powder material dispersed within the voids of the fabric such that the coating level does not exceed one ounce per square yard of fabric and the fabric retains flexibility such that a Handle-O-Meter measurement of not greater than 800 grams is maintained.

In accordance with one aspect of the present invention, a coated fabric having a controlled permeability of not greater than 1 cubic foot per minute per square foot at a pressure differential of 0.5 inches of water is provided. The coated fabric includes a fabric substrate made of synthetic yarn with a light coating of fused thermoplastic powder material preferentially disposed within the voids of the woven fabric substrate to reduce air permeability. The coating of fused thermoplastic powder is present at a level which preferably does not exceed one ounce per square yard of the coated fabric such that the flexibility of the fabric is not adversely affected. The melting point of the fused thermoplastic material which forms the coating is preferably 100 degrees C. lower than that of the synthetic yarn forming the fabric substrate, thereby permitting rapid phase change and reduction in viscosity of the thermoplastic material during a heat fusing process without affecting the fabric substrate thus eliminating the need for prolonged heat curing.

Other objects and advantages of the invention will become apparent upon reading the following detailed description and upon reference to the drawings contained herein.

BRIEF DESCRIPTION OF THE DRAWING

FIG. 1 is a schematic of a potentially preferred process for forming the coated fabric of the present invention.

FIG. 2 is a cross section of a woven airbag fabric without a coating.

FIG. 3 is a cross section of the woven fabric of FIG. 2 including a coating applied in accordance with the method of the present invention.

While the invention will be described and disclosed in connection with certain preferred embodiments and procedures, it is in no way intended to limit the invention to those specific embodiments, rather it is intended to cover equivalent structures, structural equivalents and all alternative embodiments and modifications as may be defined by the appended claims and the equivalents thereto.

DETAILED DESCRIPTION

Turning now to the figures, a processing line 10 is shown for the production of the coated fabric of the present invention. In the illustrated and potentially preferred practice, a woven fabric 12 formed from a synthetic yarn such as a polyamide (e.g. nylon 6 or nylon 6,6), polyester or other suitable synthetic material is drawn from a supply roll 14. In the preferred practice of the invention, the synthetic yarn utilized may have yarn densities of between about 200 denier and about 900 denier with a potentially more preferred range of about 270 denier to about 700 denier and a potentially most preferred range of between about 300 to about 650 denier.

One potentially preferred woven fabric is illustrated in FIG. 2. As illustrated, the fabric 12 may be a plain woven fabric formed from multifilament flat warp yarns 13 crossing in overlying and underlying relation with similar fill yarns 15. Although in the illustrated embodiment, both the warp and the fill yarns are shown as flat multifilament yarns, it is to be appreciated that alternative yarns such as single and multiply twisted and textured yarns may also be utilized. Suitable yarns for use in forming the fabric 12 are believed to be available from E. I. du Pont de Nemours having a place of business in Wilmington, Del. U.S.A. or Akzo, Nev. having a place of business in Arnhem, Netherlands.

The fabric 12 is preferably plain-woven with a substantially symmetrical set although other weaves such as basket, cross twill, satin, panama or crepe weaves as are known to those with skill in the art may also be utilized. By symmetrical fabric set is meant a fabric having substantially the same number of threads per inch in the warp and weft, with the threads having substantially the same textile properties such as linear density, tenacity and elongation at break.

In the process of the present invention, a thermoplastic material having a low melt viscosity, (e.g. polyamides, polyesters, polyolefins, thermoplastic polyurethanes or other materials as may be known to those of skill in the art) is applied in powder form from a sprinkle hopper 16.

Polyamides acceptable for use in this type of process may be the reaction products of dibasic acids (to include, but not exclusive to: dimerized fatty acids, dodecandioic acid, sabacic acid, azelaic acid and adipic acid) with diamines such as ethylene diamine, hexamethylene diamine, diethylene triamine, triethylene tetraamine, piperazine, dipiperylpropane or polyoxypropylene diamine. These polyamides may also include polymers generated from lactams such as caprolactam or dodecalactam. Preferably the polyamide powder is a copolymer (usually terpolymer) of nylon 6, nylon 12, nylon-6,6, nylon-6,9, nylon-6,10, nylon-6,11 and/or nylon-6,12.

Acceptable polyesters may be formed from the reaction of aliphatic or cyclo-aliphatic diacids including methylene groups between C6 to C12 and aliphatic di-alcohols, including methylene groups between C2 to C6. Preferably the coating is a copolymer of two or more polyesters as identified Acceptable polyolefins may be polyethylene or a copolymer of ethylene with vinyl acetate, ethyl acrylate, acrylic acid and/or methacrylic acid. Polypropylene or copolymers of ethylene with other alpha olefins such as 1-hexene or 1-octene are also suitable polyolefins.

Without limitation, the potentially preferred coating material is a co-polyester formed from the reaction of 1,3-benzenedicarboxylic acid with 1,4-benzenedicarboxylic acid and 1,4-butanediol. This material is believed to be sold under the trade designation Griltex 6P by Ems American Grilon, Inc. whose business address is believed to be 2060 Corporate Way, Sumter, S.C., USA.

As will be appreciated, sprinkle application provides for liberal coverage of the fabric 12. In particular, such application permits powder to be deposited within the interstices between the raised portions of the fabric which occur naturally at the overlap between the yarns running in the warp and the fill directions.

In the preferred practice, the fabric 12 with the applied thermoplastic material, is subjected to a doctoring operation utilizing a doctor blade 18. In a potentially preferred practice, the doctor blade will be substantially flexible so as to conform well to the surface of the fabric 12, thereby promoting substantial elimination of the thermoplastic powder from all high sections of the fabric while leaving the powder deposited in the interstices or voids of the fabric substantially undisturbed. It is believed that placement of the doctor blade 18 should be at an angle to the path of the fabric 12 so as to effectively channel the powder scraped from the surface towards the edge for easy collection in a bin 19 and reuse in the sprinkle hopper 16.

Following the doctoring of excess powder material from the fabric 12, the fabric is passed to a heating unit 20 to effect the melt fusion of the deposited thermoplastic particles. The melt fusing process may be achieved by any heating operation as is well known to those of skill in the art such as radiant or convective heaters so long as the heating is adequate to provide the rapid melting and subsequent flowing of the deposited thermoplastic material.

In a variation of this practice rather than applying uniform heat across the entire surface of the fabric, the heating unit 20 may include a discharge manifold for delivery of pressurized streams of a heated fluid such as air, nitrogen, argon, or the like. Such discharge manifolds are disclosed in U.S. Pat. Nos. 4,364,156 to Greenway et al. issued Dec. 21, 1982; 4,471,514 to Stokes issued Sep. 18, 1984; 4,499,637 to Greenway issued Feb. 19, 1985; 4,670,317 to Greenway issued Jun. 2, 1987; and 5,148,583 to Greenway issued Sep. 22, 1992 (all incorporated herein by reference). It will be appreciated that the use of such a manifold delivering hot gaseous fluid will permit selected portions of the powdered fabric 12 to be heated while substantially avoiding the application of heat to other portions. This practice results in flow and subsequent fusion of the powdered coating only in the localized areas impinged by these hot gases. The applied powder in areas not treated with the hot gases would remain unfused and may be removed for reuse. As will be appreciated, this permits selected portions of the fabric to have reduced air permeability. Accordingly, by controlling the area to which heat is applied, the overall permeability characteristics of the fabric are controllable. Thus, a fabric may be produced having relatively higher and lower permeability characteristics in different regions. Such fabric may be useful for example in the production of an airbag wherein a difference in permeability is desired in different locations of the airbag. It will be appreciated that while the use of a plurality of heated gas streams may be the preferred method of selective heat application, alternative selective heating procedures including, without limitation, masks, screens, templets, directional lamps and equivalents as may be known to those of skill in the art may likewise be utilized.

By way of example only and not limitation, the fabric 12 with applied powder may be subjected to selective heat fusing such that the coating is adhered to one-half of the fabric while the other half remains untreated. The treated fabric may thereafter be used to form the face portion of an airbag which would contact an occupant while the untreated fabric could be used to form the side panels where higher permeability is generally desired.

In another alternative, a well defined pattern of coating may be fused across the surface of the fabric to control the overall permeability of the fabric within predetermined ranges. This pattern may be adjusted in any manner desired to effect the desired coverage of the surface of the fabric to achieve a given permeability. By way of example only and not limitation, the patterning may be a cross hatch thereby providing a very low permeability if when the hatching is tight while providing higher permeabilities as the hatching is opened up thereby covering less surface area.

In an important aspect of the present invention, the thermoplastic coating must have a sufficiently low melt viscosity and melt temperature to permit the rapid phase change and flow of the particulates upon application of heat. In the preferred practice, the melt temperature of the coating should be at least 70 degrees C. and preferentially 100 degrees C., lower than that of the material forming the fabric 12. Such a temperature differential avoids the need to bring the entire system of fabric and applied powder up to a relatively high temperature before any phase change in the powder can be effected. In the preferred practice, the melt temperature for the thermoplastic powder should be no greater than about 160 degrees C. and preferably should be in the range between 120 and 150 degrees C. In the potentially preferred embodiment, the thermoplastic powder should have a melt viscosity of not greater than about 1000 Pa.s and preferably not greater than about 750 Pa.s, at 160 degrees C. and 21.2 Newtons as measured by the method of ASTM D-1238, (incorporated herein by reference).

Upon removal from the heating unit 20, the fabric 12 with heat fused thermoplastic is preferably passed in front of a blower or fan 22 to remove any particles of thermoplastic powder which did not adhere to the fabric for collection in a bin 24. The contents collected in the bin 24 may thereafter be recycled for use in the sprinkle hopper 16. As will be appreciated, while use of a blower or fan may be the preferred method for removal of unattached particulates, other standard methods, including without limitation, brushing or vacuuming may also be employed. The coated fabric 26 is thereafter delivered to a take-up roll or other collection device as is well known in the art.

The product produced from the general practice of the process of the present invention has a low overall permeability preferably not greater than one cubic foot of air per minute per square foot of fabric at a pressure drop of 0.5 inches of water as determined by Federal Test Method 5450.

A cross section of the fabric 26 produced by doctoring and heat fusing the thermoplastic powder according to the preferred practice of the present invention is illustrated in FIG. 3. As shown, the scraping operation leaves the coating material 28 deposited preferentially at the interstices between the warp yarns 13 and the fill yarns 15. Accordingly, in a plain woven fabric wherein the yarns are arranged in a checkerboard fashion, the coating material will be preferentially collected at the corners formed at the interface between adjacent yarns. It has been found that through use of such preferentially deposited coatings that the air permeability may be reduced dramatically while applying only relatively minor quantities of material to the fabric. Although the coating materials are adhered preferentially at the interstices of the fabric between the warp and the fill yarns, it is to be appreciated that the powder forming the coating may also be disposed at the some level across the yarns which level may be controlled by adjustment of the scraping operation.

The fabric also maintains excellent flexibility due to: (1) the low level of coating material utilized and (2) the elimination of extended curing of the fabric as is present in other coating operations. Specifically, the level of thermoplastic coating is not greater than about one ounce per square yard of fabric and is preferably between about 0.25 and about 0.75 ounces per square yard of fabric.

The flexibility of the coated fabric, as measured by a Handle-O-Meter test in the manner of TAPPI Method T-498 (incorporated by reference), using a 4 inch sample and a 10 mm slot, is not greater than about 800 grams and will preferably be about 450 grams or less. TAPPI Method T-498 was developed to give a quantitative measure of softness or "handle" to paper products and is based on the force necessary to push a test specimen into a slot of defined width.

EXAMPLES

The scope of the invention is further described in connection with the following examples which are set forth for the purpose of illustrating embodiments of the invention. Such examples and the embodiments disclosed therein are in no way intended to limit the scope of the invention which is defined and limited only by the scope of the claims and the equivalents thereto.

Example 1

A co-polyester resin, of the type described previously, having the physical characteristics identified in Table 1 was obtained from Ems-American Grilon, Inc., of Sumter, S.C. under the trade designation Griltex 6P.

TABLE I

| PROPERTY | UNIT | GRILTEX 6P |
|---|---|---|
| Melting Range Point | Degrees C. | 25–130 |
| Melt Viscosity | Pa · s | 750 |

TABLE I-continued

| PROPERTY | UNIT | GRILTEX 6P |
|---|---|---|
| Melt Index | Grams/10 minutes | 17 |
| Particle Size (65% to 70%) | Micron | 0 to 50 |

The melt viscosity and melt index as identified Table 1 were both measured according to the procedures of ASTM standard D1238. "Standard Test Method for Flow Rate of Thermoplastics by Extrusion Plastometer."

An airbag fabric formed from 420 denier nylon yarn woven in a 49×49 plain weave structure was sprinkled liberally on one face with Griltex 6P. A rubber blade was then drawn across the face of the fabric to remove excess powder from the high places. The fabric with applied powder was placed in an oven at 160° C. for sixty seconds. A coated fabric was obtained having the physical properties identified in Table 1A.

TABLE 1A

| PROPERTY | MEASUREMENT | |
|---|---|---|
| Air Permeability | 0.4 CFM/sq ft at 0.5 inches water | |
| Tensile Strength | Warp | 484 pounds force |
|  | Fill | 510 pounds force |
| Elongation at Break | Warp | 42% |
|  | Fill | 41% |
| Trapezoidal Tear | Warp | 72 pounds force |
|  | Fill | 85 pounds force |
| Mullon Burst Strength |  | 762 PSI |
| Handle-O-Meter (4 inch sample and 10 mm slot) | Warp | 129 |
|  | Fill | 144 |
| Weight | 5.93 ounces/square yard | |

The coated fabric produced was then heat aged for fifteen days at 120° C. The properties obtained are set forth in Table 1B.

TABLE 1B

| PROPERTY | MEASUREMENT | |
|---|---|---|
| Air Permeability | 0.6 CFM/sq ft at 0.5 inches water | |
| Tensile Strength | Warp | 451 pounds force |
|  | Fill | 526 pounds force |
| Elongation at Break | Warp | 38% |
|  | Fill | 42% |
| Trapezoidal Tear | Warp | 68 pounds force |
|  | Fill | 77 pounds force |
| Handle-O-Meter (4 inch sample 10 mm slot) | Warp | 148 |
|  | Fill | 167 |

Example 2

The procedures of Example I were carried out except that the thermoplastic powder, Griltex 6P, was applied to a 41×37 plain weave airbag fabric formed from 650 denier polyester yarn. The physical properties for the coated fabric obtained after exposure to 160 degrees C. for sixty seconds are shown in Table 2A.

TABLE 2A

| PROPERTY | MEASUREMENT | |
|---|---|---|
| Air Permeability | 0.61 CFM/sq ft at 0.5 inches water | |
| Tensile Strength | Warp | 659 pounds force |
|  | Fill | 610 pounds force |
| Elongation at Break | Warp | 32% |
|  | Fill | 44% |
| Trapezoidal Tear | Warp | 77 pounds force |
|  | Fill | 75 pounds force |
| Mullon Burst Strength |  | 978 PSI |
| Handle-O-Meter (4 inch sample 10 mm slot) | Warp | 789 |
|  | Fill | 292 |
| Weight | 7.61 ounces/square yard | |

The properties of this fabric after heat aging for 15 days at 120 degrees C. are provided in the following Table 2B.

TABLE 2B

| PROPERTY | MEASUREMENT | |
|---|---|---|
| Air Permeability | 0.59 CFM/sq ft at 0.5 inches water | |
| Tensile Strength | Warp | 651 pounds force |
|  | Fill | 582 pounds force |
| Elongation at Break | Warp | 33% |
|  | Fill | 44% |
| Trapezoidal Tear | Warp | 81 pounds force |
|  | Fill | 75 pounds force |
| Handle-O-Meter (4 inch sample 10 mm slot) | Warp | 488 grams |
|  | Fill | 226 grams |

In accordance with the above description, it is seen that the present invention provides a coated airbag fabric having low controlled permeability while maintaining substantial flexibility due to the relatively low level of applied coating. Moreover, this fabric may be produced without the need for extensive heat curing processes with heat application times of one minute being satisfactory to produce a useful coated product.

While specific embodiments of the invention have been illustrated and described, it is to be understood that the invention is not limited thereto since modifications may be made and other embodiments of the principles of the invention will occur to those skilled in the art to which the invention pertains. Therefore, it is intended by the appended claims to cover any modifications and other embodiments as may incorporate the features of this invention within the true spirit and scope of such claims.

What is claimed is:

1. A process for forming a coated fabric having a controlled air permeability less than that of the uncoated fabric, the process comprising the steps of:

(a) applying a layer of thermoplastic powder material having a first melting point across at least a portion of a woven fabric substrate having a second melting point at least 70 degrees C. higher than said first melting point at a controlled level of not greater than about one ounce per square yard of fabric; and (b) heat fusing said thermoplastic powder material applied in step "a" at a temperature of at least 150 degrees C., by means of a plurality of nozzles delivering pressurized streams of hot fluid in impingement against localized areas of said fabric substrate in a determined pattern, to form an interrupted fused coating across said fabric substrate, in a given pattern substantially corresponding to the localized areas impinged by said pressurized streams of hot fluid; such that a partially coated fabric having a Handle-O-Meter flexibility measurement on a four inch sample using a 10 mm gap of not greater than about 800 grams is formed.

2. The invention as in claim 1, wherein said thermoplastic powder material is a co-polyester.

3. The invention as in claim 2, wherein said woven fabric substrate is nylon.

4. The invention as in claim 2, wherein said woven fabric substrate is polyester.

5. The invention as in claim 1, wherein said thermoplastic powder material is co-polyamide.

6. The invention as in claim 5, wherein said woven fabric substrate is nylon.

7. The invention as in claim 5, wherein said woven fabric substrate is polyester.

* * * * *